United States Patent
Ribour et al.

(10) Patent No.: US 9,359,493 B2
(45) Date of Patent: Jun. 7, 2016

(54) HIGH-DENSITY POLYETHYLENE FOR CAPS AND CLOSURES

(71) Applicant: TOTAL RESEARCH & TECHNOLOGY FELUY, Seneffe (BE)

(72) Inventors: David Ribour, Mons (BE); Alain Standaert, Brussels (BE); Daniel Siraux, Naast (BE); Ludovic Horion, La Louviere (BE); Olivier Lhost, Havre (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/348,135

(22) PCT Filed: Sep. 28, 2012

(86) PCT No.: PCT/EP2012/069266
§ 371 (c)(1),
(2) Date: Mar. 28, 2014

(87) PCT Pub. No.: WO2013/045663
PCT Pub. Date: Apr. 4, 2013

(65) Prior Publication Data
US 2014/0371397 A1    Dec. 18, 2014

(30) Foreign Application Priority Data

Sep. 30, 2011 (EP) .................................. 11183480

(51) Int. Cl.
*C08L 23/06* (2006.01)
*B29D 99/00* (2010.01)
*B29L 31/56* (2006.01)

(52) U.S. Cl.
CPC .............. *C08L 23/06* (2013.01); *B29D 99/0096* (2013.01); *B29L 2031/565* (2013.01); *C08L 2205/025* (2013.01); *C08L 2207/062* (2013.01)

(58) Field of Classification Search
CPC ... C08L 23/06; C08L 23/04; C08L 2207/062; C08L 2205/025; C08L 2205/02; B29D 99/0096; B29L 2031/565

USPC ............................ 525/191, 240; 264/328.17
See application file for complete search history.

(56) References Cited

U.S. PATENT DOCUMENTS

| | | | |
|---|---|---|---|
| 5,106,804 A | 4/1992 | Bailly et al. | |
| 5,153,158 A | 10/1992 | Kioka et al. | |
| 5,594,071 A | 1/1997 | Takahashi et al. | |
| 2007/0255033 A1 | 11/2007 | Kipke et al. | |
| 2010/0084363 A1 † | 4/2010 | Michie | |
| 2010/0261848 A1 | 10/2010 | Wang | |

FOREIGN PATENT DOCUMENTS

| | | | |
|---|---|---|---|
| CN | 1976957 A | 6/2007 | |
| EP | 0152701 A1 | 8/1985 | |
| EP | 0368577 A2 | 5/1990 | |
| WO | 0071615 A1 | 11/2000 | |
| WO | 03102069 A1 | 12/2003 | |
| WO | 2010088265 A1 | 8/2010 | |
| WO | WO 2010/088265 A1 * | 8/2010 | ............. C08L 23/04 |
| WO | 2011057924 A1 | 5/2011 | |

OTHER PUBLICATIONS

Blomenhofer et al. in Macromolecules 2005, 38, 3688-3695.
International Search Report issued in International Application No. PCT/EP2012/069266, dated Oct. 23, 2012 (4 pages).
Office Action issued in Chinese Application No. 201280059071.8, dated Aug. 25, 2015, 23 pages.

* cited by examiner
† cited by third party

*Primary Examiner* — Nathan M Nutter
(74) *Attorney, Agent, or Firm* — Albert Shung

(57) ABSTRACT

A high-density polyethylene (HDPE) can be adapted for the manufacture of caps and closures. The caps and closures can be used as screw-on caps for carbonated or still drinks. The high-density polyethylene can have a density of at least 940 kg/m³ and of at most 970 kg/m³, and a high load melt index HLMI of at least 35 dg/min and of at most 180 dg/min. The high-density polyethylene can include a first polyethylene fraction and a second polyethylene fraction. The first polyethylene fraction can have a density of at least 920 kg/m³ and of at most 945 kg/m³, and a melt index HL275 of at least 3 dg/min and of at most 12 dg/min. The second polyethylene fraction can have a density of at least 960 kg/m³ and of at most 980 kg/m³.

19 Claims, No Drawings

HIGH-DENSITY POLYETHYLENE FOR CAPS AND CLOSURES

CROSS REFERENCE TO RELATED APPLICATIONS

This application claims the benefit of PCT/EP2012/069266, filed on Sep. 28, 2012, which claims priority from European Application No. 11183480.0, filed on Sep. 30, 2011.

FIELD OF THE INVENTION

The present invention relates to an improved high-density polyethylene (HDPE), particularly adapted for the manufacture of caps and closures, which may for example be used as screw-on caps for carbonated or still drinks. Hence, the present invention also relates to such caps and closures as well as to their use.

The Technical Problem and the Prior Art

Polyethylene has become one of the materials of choice in the caps and closures market. This is because polyethylene offers a good balance of mechanical properties and can easily be processed either by injection molding or by compression molding. Recent efforts to reduce the weight of the polyethylene caps and closures now necessitate polyethylenes with improved properties.

It is therefore an object of the present invention to provide a cap or closure comprising a polyethylene composition having improved rigidity.

It is also an object of the present invention to provide a cap or closure comprising a polyethylene composition with improved ESCR properties.

It is a further object of the present invention to provide a cap or closure comprising a polyethylene with good processability in injection molding or compression molding or both.

It is an additional object of the present invention to provide a cap or closure having acceptable organoleptic properties.

BRIEF DESCRIPTION OF THE INVENTION

It has now surprisingly been found that the above objectives can be attained either individually or in any combination by a cap or closure comprising the specific and well-defined polyethylene composition as disclosed herein.

Thus, the present invention provides for a cap or closure comprising a polyethylene composition having a density of at least 940 kg/m$^3$ and of at most 970 kg/m$^3$ and a high load melt index HLMI of at least 35 dg/min and of at most 180 dg/min, said polyethylene composition consisting of a first polyethylene fraction and a second polyethylene fraction, wherein the first polyethylene fraction has a density of at least 920 kg/m$^3$ and of at most 945 kg/m$^3$ and a melt index HL275 of at least 3 dg/min and of at most 12 dg/min, and wherein the second polyethylene fraction has a density of at least 960 kg/m$^3$ and of at most 980 kg/m$^3$, with the provision that the density and melt index of the second polyethylene fraction are chosen such that density and melt index of the polyethylene composition are as defined, and with properties being determined as indicated in the test methods.

In addition, the present invention provides for a process for the production of a cap or closure, said process comprising the steps of
  (a) polymerizing ethylene in the presence of a Ziegler-Natta polymerization catalyst in a first polymerization reactor to produce a first polyethylene fraction having a density of at least 920 kg/m$^3$ and of at most 945 kg/m$^3$ and a melt index HL275 of at least 3 dg/min and of at most 12 dg/min;
  (b) polymerizing ethylene and at least one comonomer in presence of a Ziegler-Natta polymerization catalyst in a second polymerization reactor to produce a second polyethylene fraction having a density of at least 960 kg/m$^3$ and of at most 980 kg/m$^3$;
  (c) blending said first polyethylene fraction and said second polyethylene fraction to obtain a polyethylene composition having a density of at least 940 kg/m$^3$ and of at most 970 kg/m$^3$ and a high load melt index HLMI of at least 35 dg/min and of at most 180 dg/min;
  (d) subsequently injection molding said polyethylene composition to obtain a cap or closure,
with the provision that the density and melt index of the second polyethylene fraction are chosen such that density and melt index of the polyethylene composition are as defined, and with properties being determined as indicated in the test methods.

DETAILED DESCRIPTION OF THE INVENTION

For the purposes of the present application, the properties of the polymers and articles are determined as indicated in detail in the test methods.

For the purposes of the present application, the term "polyethylene" is used to denote ethylene homopolymer as well as ethylene copolymers.

The cap or closure of the present application comprises a polyethylene composition with a specific density and a specific melt index.

Preferably, the cap or closure comprises said polyethylene composition in at least 70 wt %, more preferably in at least 80 wt % or 90 wt %, even more preferably in at least 97 wt % or 98 wt %, and still even more preferably in at least 99 wt %, relative to the total weight of said polyethylene composition. It is most preferred that the cap and closure essentially consists of said polyethylene composition. The term "essentially consisting" is meant to include the possible presence of additives as defined below in their generally used concentrations. In any case, the weight percentages of the components of said polyethylene composition are required to add up to 100.

The polyethylene composition used herein has a high load melt index HLMI of at least 35 dg/min and of at most 180 dg/min. Said melt index HLMI is preferably at least 40 dg/min, and most preferably at least 45 dg/min. Said high load melt index HLMI is preferably at most 140 dg/min or 120 dg/min, more preferably at most 100 dg/min or 90 dg/min, even more preferably at most 80 dg/min, and most preferably at most 75 dg/min.

The polyethylene composition used herein has a density of at least 940 dg/m$^3$ and of at most 970 kg/m$^3$. Said density is preferably at least 945 kg/m$^3$, more preferably at least 950 kg/m$^3$, even more preferably at least 951 kg/m$^3$, and most preferably at least 952 kg/m$^3$. Said density is preferably at most 965 kg/m$^3$, more preferably at most 960 kg/m$^3$, even more preferably at most 959 kg/m$^3$, still even more preferably at most 958 kg/m$^3$, and most preferably at most 957 kg/m$^3$.

It is essential that the polyethylene composition used herein consists of a first polyethylene fraction and a second polyethylene fraction, each having specific properties.

The first polyethylene fraction has a density of at least 920 kg/m$^3$ and of at most 945 kg/m$^3$. Said density of the first polyethylene fraction is preferably at least 925 kg/m$^3$, more preferably at least 928 kg/m$^3$, even more preferably at least 929 kg/m³, and most preferably at least 930 kg/m³. Said density of the first polyethylene fraction is preferably at most 940 kg/m³, more preferably at most 937 kg/m³, even more preferably at most 936 kg/m³, and most preferably at most 935 kg/m³.

The first polyethylene fraction has a melt index HL275 of at least 3.0 dg/min and of at most 12 dg/min. Said melt index HL275 of the first polyethylene fraction is preferably at least 3.5 dg/min, more preferably at least 4.0 dg/min, and most preferably at least 4.5 dg/min. Said melt index HL275 of the first polyethylene fraction is preferably at most 11 dg/min.

Hence, the first polyethylene fraction is essentially a copolymer of ethylene and one or more, preferably a single, comonomer. Preferred comonomers are alpha-olefins having from 3 to 20 carbon atoms or from 3 to 10 carbon atoms. More preferred comonomers are selected from the group consisting of propylene, butene-1, pentene-1, hexene-1, heptene-1, octene-1, nonene-1 and decene-1. Even more preferred comonomers are selected from the group consisting of butene-1, hexene-1 and octene-1. The most preferred comonomer is hexene-1.

The second polyethylene fraction has a density of at least 960 kg/m³ and of at most 980 kg/m³. It is thus an ethylene homopolymer, essentially without any comonomer. By "essentially without" is meant that no comonomer is intentionally added during the production of said second polyethylene fraction, but can nevertheless be present in up to 0.2 wt %, preferably in up to 0.1 wt % and most preferably in up to 0.05 wt %, relative to the total weight of said second polyethylene fraction. The density of said polyethylene fraction is preferably at least 965 kg/m³, more preferably at least 966 kg/m³, even more preferably at least 967 kg/m³, and most preferably 968 kg/m³. The density of said polyethylene fraction is preferably at most 975 kg/m³, more preferably at most 974 kg/m³, even more preferably at most 973 kg/m³, and most preferably at most 972 kg/m³.

The properties of the second polyethylene fraction, particularly its density and melt index, though not particularly limited are chosen such that the properties of the polyethylene composition resulting from blending the first and the second polyethylene fraction are within the limits as defined in this application.

The melt index and density of the second polyethylene fraction may for example be calculated using the following equations $$\log(\text{HLMI}_{blend}) = w_1 \cdot \log(\text{HLMI}_1) + w_2 \cdot \log(\text{HlMI}_2) \quad (I)$$

$$d_{blend} = w_1 \cdot d_1 + w_2 \cdot d_2 \quad (II)$$

with $\text{HLMI}_{blend}$ being the high load melt index HLMI of the polyethylene composition, $\text{HLMI}_1$ being the high load melt index HLMI of the first polyethylene fraction, $\text{HLMI}_2$ being the high load melt index of the second polyethylene fraction, $d_{blend}$ being the density of the polyethylene composition, $d_1$ being the density of the first polyethylene fraction, $d_2$ being the density of the second polyethylene fraction, $w_1$ being the wt % of the first and $w_2$ being the wt % of the second polyethylene fraction, relative to the total weight of the polyethylene composition.

Preferably, the polyethylene composition used herein comprises at least 35 wt % and at most 55 wt %, relative to the total weight of said polyethylene composition, of the first polyethylene fraction. Preferably, the polyethylene compositions comprises at least 40 wt % of the first polyethylene fraction. Preferably, the polyethylene composition comprises at most 50 wt % of the first polyethylene fraction. The second polyethylene composition is comprised in said polyethylene composition such that the weight percentages of the first and the second polyethylene fraction, relative to the total weight of said polyethylene composition, add up to 100.

The polyethylene composition may further comprise at least one additive independently selected from, such as by way of example, the groups of antioxidants, light stabilizers, acid scavengers, lubricating agents, antistatic agents, nucleating/clarifying agents, processing aids, and colorants. An overview of such additives may be found in Plastics Additives Handbook, ed. H. Zweifel, 5th edition, 2005, Hanser Publishers.

Preferably, the polyethylene composition comprises at least one additive selected from the group consisting of nucleating agents, antistatic agents, processing aids, and blends of any of these, such as a blend of nucleating agent(s) and antistatic agent(s) or a blend of nucleating agent(s) and processing aid(s) or a blend of antistatic agent(s) and processing aid(s) or a blend of all three.

Nucleating Agents

Preferably, the polyethylene composition used herein comprises one or more nucleating agents, more specifically one or more alpha-nucleating agents. For the purposes of the present application, a nucleating agent is defined as a chemical compound that raises the crystallization temperature of the polypropylene composition.

Suitable nucleating agents for use herein can be selected from any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these.

Examples for carboxylate salts are organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1]heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis(p-ethyl-dibenzylidene sorbitol), bis(3,4-dimethyl-dibenzylidene sorbitol) (DMDBS), and bis(4-propylbenzylidene) propyl sorbitol. Bis(3,4-dimethyl-dibenzylidene sorbitol) (DMDBS) and bis(4-propylbenzylidene)propyl sorbitol are preferred. These can for example be obtained from Milliken Chemical under the trade names of Millad 3905, Millad 3940, Millad 3988 and Millad NX8000.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula (II)

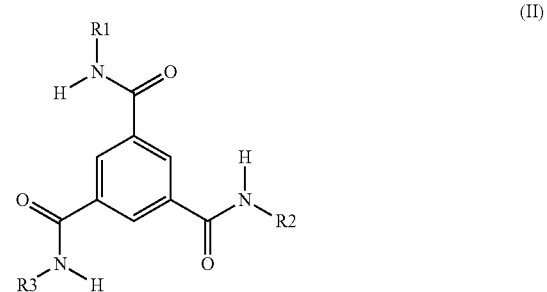

wherein R1, R2 and R3 as indicated in formula (II), independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695. A specific example of such a nucleating agent is N,N',N''-tris(2-methylcyclohexyl)-1,2,3-propanetricarboxamide, which is for example commercially available from Rika International Limited under the tradename RIKACLEAR PC1.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the metallocene random copolymer of propylene and one or more comonomers. In physical blending the polymeric nucleating agent containing vinyl compounds is mixed with the metallocene random copolymer of propylene and one or more comonomers in an extruder or in a blender. In chemical blending the metallocene random copolymer of propylene and one or more comonomers comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further examples of polymeric nucleating agents are poly-3-methyl-1-butene, polydimethylstyrene, polysilanes and polyalkylxylenes. As explained for the polymeric nucleating agents containing vinyl compounds, these polymeric nucleating agents can be introduced into the metallocene polypropylene either by chemical or by physical blending.

Further, it is possible to use blends of nucleating agents, such as for example a blend of talc and a phosphate ester salt or a blend of talc and a polymeric nucleating agent containing vinyl compounds.

The nucleating agent may be introduced into the polypropylene composition by blending it with a nucleating agent, which is either in pure form or in form of a masterbatch, for example by dry-blending or by melt-blending. It is within the scope of the present invention that the nucleating agent can be introduced into the polypropylene composition by blending it with a thermoplastic polymer comprising a nucleating agent, wherein said thermoplastic polymer is different from the metallocene random copolymer as defined above.

While it is clear to the skilled person that the amount of nucleating agent to be added depends upon its crystallization efficiency, for the purposes of the present invention the nucleating agent or the blend of nucleating agents—if comprised at all—is present in the polypropylene composition in an amount of at least 50 ppm, preferably at least 100 ppm. It is present in an amount of at most 5000 ppm, preferably of at most 4000 ppm, even more preferably of at most 3000 ppm and most preferably of at most 2000 ppm.

Processing Aid

Preferably, the polyethylene composition used herein comprises one or more processing aids. Suitable processing aids for use herein can be selected from any of the processing aids known to the skilled person. It is, however, preferred that the processing aid be selected from the group consisting of fluoropolymer-based processing aids, silicone-based processing aids, and blends thereof.

Examples for fluoropolymer-based processing aids are polymers of vinylidene fluoride ($H_2C=CF_2$) and/or copolymers of vinylidene fluoride and hexafluoropropylene ($F_2C=CF-CF_3$). The copolymers of vinylidene fluoride and hexafluoropropylene are commonly referred to as "fluoroelastomers". The content of the comonomer hexafluoropropylene in a fluoroelastomer is usually in the range of 30 to 40% by weight. Fluoropolymers suited as processing aids are for example commercially available under the Dynamar®, Viton® and Kynar® trade names from Dyneon, DuPont-Dow Elastomers or Arkema.

Examples for silicone-based processing aids are polydimethyl silicone oils or, more preferably, high molecular weight polydimethyl siloxanes of the general formula $-(O-Si(CH_3)_2-O)_n-$. Such silicone based processing aids are for example commercially available from Dow Corning.

If present, said processing aids are preferably comprised in the polyethylene composition in an amount of at least 50 ppm, more preferably in an amount of at least 100 ppm, and most preferably in an amount of at least 200 ppm. Said processing aids are preferably comprised in the polyethylene composition in an amount of at most 1000 ppm, preferably in an amount of at most 800 ppm, more preferably in an amount of at most 600 ppm, even more preferably in an amount of at most 500 ppm and most preferably in an amount of at most 400 ppm.

Antistatic Agent

Preferably, the polyethylene composition used herein comprises one or more antistatic agents. The choice of antistatic agent is not particularly limited and can be any generally used by the skilled person. It is, however, preferred that the antistatic agent be selected from the group consisting of fatty acid esters, fatty acid amides, ethoxylated alkylamines, diethanolamides, ethoxylated alcohols, and blends thereof.

Examples of fatty acid esters are esters of fatty acids with general formula $C_mH_{2m+1}COOH$, wherein $C_mH_{2m+1}$ is a, preferably linear, hydrocarbyl group (alkyl group) with m ranging from 1 to 35, preferably from 5 to 30, even more preferably from 10 to 25, and most preferably from 15 to 20. The most preferred fatty acid esters are glycerol monostearate, glycerol distearate and glycerol tristearate.

Examples of fatty acid amides are erucamide (cis-$CH_3(CH_2)_7CH=CH(CH_2)_{11}CONH_2$) and behenamide ($CH_3(CH_2)_{20}CONH_2$).

Examples of ethoxylated amines are those of general formula $C_mH_{2m+1}N(CH_2-CH_2-OH)_2$, wherein $C_mH_{2m+1}$ is an alkyl group with m ranging from 1 to 30.

Examples of diethanolamides are those of general formula $C_mH_{2m+1}-C(O)-N(CH_2-CH_2-OH)_2$, wherein $C_mH_{2m+1}$ is an alkyl group with m ranging from 1 to 30, preferably from 5 to 25 and most preferably from 10 to 20.

Examples of ethoxylated alcohols are those of general formula $H-(O-CH_2-CH_2)_n-C_mH_{2m+1}$, wherein $C_mH_{2m+1}$ is an alkyl group with m ranging from 1 to 30, preferably from 5 to 25 and most preferably from 10 to 20, and n is preferably from 1 to 15.

If present, the one or more antistatic agents are preferably comprised in the polyethylene composition in an amount of at least 100 ppm, more preferably of at least 200 ppm, even more preferably of at least 300 ppm, even more preferably of at least 400 ppm and most preferably of at least 500 ppm. The one or more antistatic agents are preferably comprised in the polyethylene composition in an amount of at most 20,000 ppm or 15,000 ppm or 10,000 ppm, more preferably of at most 9,000 ppm or 8,000 ppm, even more preferably of at most 7,000 ppm or 6,000 ppm and most preferably of at most 5,000 ppm.

The first and second polyethylene fractions used herein may be produced using any Ziegler-Natta polymerization catalyst. Such catalysts are generally well known to the person skilled in the art. They generally comprise a titanium compound, which has at least one titanium-halogen bond, and an optional internal electron donor, both on a suitable support, for example on a magnesium halide in active form. In addition such catalysts may comprise an organoaluminum compound, such as for example an aluminum trialkyl, and an optional external electron donor.

Preferably, the Ziegler-Natta catalyst system used to prepare the polyethylene fractions herein comprises a Ziegler-Natta catalyst component D and a preactivating agent, wherein the Ziegler Natta catalyst component D is obtainable by:
  a) generating a reaction product A by contacting a magnesium dialkoxide compound with a halogenating agent;
  b) contacting reaction product A with a first halogenating/titanating agent to form reaction product B;
  c) contacting reaction product B with a second halogenating/titanating agent to form reaction product C; and
  d) contacting reaction product C with a third halogenating/titanating agent to form catalyst component D.

Preferably, said preactivating agent is an organoaluminum compound represented by the following general formula (I)

$$R_{3-n}AlX_n \qquad (I)$$

wherein each R is independently selected from alkyl having from one to ten carbon atoms, each X is independently a halogen atom, and n is 0, 1 or 2.

Preferably R is an alkyl having from one to six carbons atoms, such as for example methyl, ethyl, n-propyl, iso-propyl, n-butyl, sec-butyl, tert-butyl, pentyl and hexyl. Most preferably R is ethyl.

Preferably X is selected from the group consisting of fluorine, chlorine, bromine and iodine. Most preferably X is chlorine.

Preferably n is 0 or 1. Most preferably n is 0.

Exemplary organoaluminum compounds purified in accordance with the present invention are trimethylaluminum ($Me_3Al$), triethylaluminum ($Et_3Al$, frequently referred to as "TEAL"), tri-n-propylaluminum ($nPr_3Al$), tri-iso-propylaluminum ($iPr_3Al$), tri-n-butylaluminum ($nBu_3Al$), tri-iso-butylaluminum ($iBu_3Al$, frequently referred to as "TIBAL"), and tri-sec-butylaluminum ($secBu_3Al$), of which triethylaluminum is the most preferred one.

Preferably, the halogenating agent is $ClTi(OPr)_3$.

Preferably, the first halogenating/titanating agent a mixture of $TiCl_4$ and $Ti(OBu)_4$, in a molar ratio range of from 0.5:1 to 6:1 of $TiCl_4/Ti(OBu)_4$. More preferably the molar ratio is 2:1 of $TiCl_4/Ti(OBu)_4$.

Preferably, the second halogenating/titanating agent is $TiCl_4$.

Preferably, the third halogenating/titanating agent is also $TiCl_4$.

By "Ziegler-Natta catalyst system," we mean a Ziegler-Natta catalyst component in combination with a preactivating agent.

By "Ziegler-Natta catalyst component," we mean a transition metal compound that incorporates a Group 4-8 transition metal, preferably a Group 4-6 transition metal, and one or more ligands that satisfy the valence of the metal. The ligands are preferably halide, alkoxy, hydroxy, oxo, alkyl, and combinations thereof. Ziegler-Natta catalysts exclude metallocenes or other single-site catalysts.

It is thought that the Ziegler-Natta catalyst used in the process of this invention without being bound to theory has the effect that the resin has an overall higher molecular weight (i.e. higher extrudate swell) without affecting the low molecular weight tailing (i.e. better impact properties).

The present invention provides a polymerisation process wherein the catalyst is preferably made according to a process comprising the following steps:
  a) contacting a magnesium dialkoxide compound with a halogenating agent to form a reaction product A;
  b) contacting reaction product A with a first halogenating/titanating agent to form reaction product B;
  c) contacting reaction product B with a second halogenating/titanating agent to form reaction product C; and
  d) contacting reaction product C with a third halogenating/titanating agent to form reaction product D.

The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/l.

Another embodiment of the present invention provides a polyolefin catalyst produced by a process generally comprising contacting a catalyst component of the invention together with an organometallic agent. The catalyst component is produced by a process as described above. The catalysts of the invention can have a fluff morphology amenable to polymerization production processes, and may provide a polyethylene having a molecular weight distribution of at least 5.0 and may provide uniform particle size distributions with low levels of particles of less than about 125 microns. The activity of the catalyst is dependent upon the polymerization conditions. Generally the catalyst will have an activity of at least 5,000 gPE/g catalyst, but the activity can also be greater than 50,000 gPE/g catalyst or greater than 100,000 gPE/g catalyst.

Even another embodiment of the present invention provides a polyolefin polymer produced by a process comprising: a) contacting one or more olefin monomers together in the presence of a catalyst of the invention, under polymerization conditions; and b) extracting polyolefin polymer. Generally the monomers are ethylene monomers and the polymer is polyethylene.

According to one embodiment of the invention, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

One embodiment of the present invention can be generally as follows:

$$MRR'+2R"OH \rightarrow M(OR")_2 \qquad 1.$$

$$M(OR")_2+ClAR'''_x \rightarrow \text{"A"} \qquad 2.$$

$$\text{"A"}+TiCl_4/Ti(OR'''')_4 \rightarrow \text{"B"} \qquad 3.$$

$$\text{"B"}+TiCl_4 \rightarrow \text{"C"}; \qquad 4.$$

$$\text{"C"}+TiCl_4 \rightarrow \text{"D"} \qquad 5.$$

$$\text{"D"}+\text{preactivating agent} \rightarrow \text{catalyst} \qquad 6.$$

In the above formulas, M can be any suitable metal, usually a Group IIA metal, typically Mg. In the above formulas, R, R', R", R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R" generally comprises from 3 to 20 carbon atoms, R''' generally comprises from 2-6 carbon atoms, and R'''' generally comprises from 2-6 carbon atoms and is typically butyl. Any combination of two or more of R, R', R", R''', and R'''' can be used, may be the same, or the combination of the R groups may be different from one another.

In the above embodiment comprising formula ClAR'''$_x$, A is a non-reducing oxophilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. Non-limiting examples of a chlorinating agent that can be used in the present invention are ClTi(O$^i$Pr)$_3$ and ClSi(Me)$_3$.

The metal dialkoxide of the above embodiment is chlorinated to form a reaction product "A". While the exact composition of product "A" is unknown, it is believed that it contains a partially chlorinated metal compound, one example of which may be ClMg(OR").

Reaction product "A" is then contacted with one or more halogenating/titanating agent, such as for example a combination of TiCl$_4$ and Ti(OBu)$_4$, to form reaction product "B". Reaction product "B" which is probably a complex of chlorinated and partially chlorinated metal and titanium compounds. Reaction product "B" can comprise a titanium impregnated MgCl$_2$ support and for example, may possibly be represented by a compound such as $(MCl_2)_y(TiCl_x(OR)_{4-x})_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by $(MCl_2)_y(TiCl_x(OR)_{4-x})_{z''}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by $(MCl_2)_y(TiCl_{x'}(OR)_{4-x'})_{z'''}$. It is expected that the level of halogenation of "D" would be greater than that of product "C". This greater level of halogenation would produce a different complex of compounds. While this description of the reaction products offers the most probable explanation of the chemistry at this time, the invention as described in the claims is not limited by this theoretical mechanism.

Metal dialkyls and the resultant metal dialkoxides suitable for use in the present invention can include any that can be utilized in the present invention to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesium dialkyl.

In the practice of the present invention, the metal dialkoxide can be a magnesium compound of the general formula Mg(OR")$_2$ where R" is a hydrocarbyl or substituted hydrocarbyl of 1 to 20 carbon atoms.

The metal dialkoxide can be soluble and is typically non-reducing. A non-reducing compound has the advantage of forming MgCl$_2$ instead of insoluble species that can be formed by the reduction of compounds such as MgRR', which can result in the formation of catalysts having a broad particle size distribution. In addition, Mg(OR")$_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di(2-ethylhexoxide), may be produced by reacting an alkyl magnesium compound (MgRR') with an alcohol (ROH), as shown below. MgRR'+2R"OH→Mg(OR")$_2$+RH+R'H The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the present invention, any alcohol yielding the desired metal dialkoxide may be utilized. Generally, the alcohol utilized may be any alcohol of the general formula R"OH where R" is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the present invention will yield a suitable polyolefin catalyst. The halogenating step can be a chlorinating step where the halogenating agent contains a chloride (i.e. is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours.

The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as $TiCl_4$ or $Ti(OR'''')_4$. The halogenation/titanation agent utilized can be a chlorination/titanation agent.

The halogenation/titanation agent may be a single compound or a combination of compounds. The method of the present invention provides an active catalyst after the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of $TiCl_4$ and $Ti(OBu)_4$ in a range from 0.5:1 to 6:1 $TiCl_4/Ti(OBu)_4$, the ratio can be from 2:1 to 3:1. It is believed that the blend of titanium halide and organic titanate react to form a titanium alkoxyhalide, $Ti(OR)_aX_b$, where OR and X are alkoxide and halide, respectively and a+b is the valence of titanium, which is typically 4.

In the alternative, the first halogenation/titanation agent may be a single compound. Examples of a first halogenation/titanation agent are $Ti(OC_2H_5)_3Cl$, $Ti(OC_2H_5)_2Cl_2$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$, and $Ti(OC_{12}H_5)Cl_3$.

The first halogenation/titanation step is generally carried out by first slurrying the halogenation product "A" in a hydrocarbon solvent at room temperature/ambient temperature. Nonlimiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5.

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/l. Within the present invention [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/l, less than about 50 mmol/l, or less than about 10 mmol/l. After the final halogenating/titanating step, the product can be washed until the [Ti] is less than a desired amount, for example, less than about 20 mmol/l, less than about 10 mmol/l, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminum preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 4.

In general, the ratio of Al to titanium can be in the range from 0.1:1 to 2:1 and typically is 0.25:1 to 1.2:1.

Optionally, the Ziegler-Natta catalyst may be pre-polymerized. Generally, a pre-polymerization process is affected by contacting a small amount of monomer with the catalyst after the catalyst has been contacted with the preactivating agent. A pre-polymerization process is described in U.S. Pat. No. 5,106,804; U.S. Pat. No. 5,153,158; and U.S. Pat. No. 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the present invention that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt_3)$], where R and R' are alkyls with 1-5 carbon atoms and may be the same or different.

For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethylphenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the present invention can be selected from a silane compound of the following formula: wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxysilane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

The polyethylene composition used herein may alternatively be obtained either (i) by producing the first and the second polyethylene fraction separately from one another and then physically blending them, for example in an extruder or blender or mixer; or (ii) by successively producing the first and second polyethylene fraction in at least two serially connected polymerization reactors.

Preferably, the first and second polyethylene fractions are successively produced in at least two serially connected polymerization reactors. More preferably, the first and second polyethylene fractions are successively produced in at least two serially connected loop reactors, even more preferably in at least two slurry loop reactors, and most preferably in at least two liquid full loop reactors.

Polymerization catalyst may be added to any of the at least two polymerization reactors, provided that it is added at least to the first polymerization reactor of the series. The polymerization catalyst added to different polymerization reactors may be the same or may be different. It is, however, preferred that the polymerization catalyst is the same and is only added to the first polymerization reactor of the series. If such is the case, it is preferred that the polymerization takes place in presence of the combined polyethylene fractions produced in the previous polymerization reactors, i.e. that the combined polyethylene fractions are transferred to the successive polymerization reactor.

The sequence, in which the first and second polyethylene fraction are produced, is not particularly important. It is, however, preferred that the first polyethylene fraction is produced in the first polymerization reactor and that the second polyethylene fraction is produced in the second polymerization reactor. The respective molecular weight of the polyethylene fractions produced in each polymerization reactor may be controlled by known techniques, such as for example by choice of polymerization catalyst and temperature or by using hydrogen in different concentrations.

In a preferred arrangement, the product of a first reactor, including the olefin monomer, is contacted with the second co-reactant and the catalyst system in a second reactor to produce and mix the second polyolefin with the first polyolefin in the second reactor. This is also known as a chemical blend. The first and second reactors are conveniently interconnected, i.e. serially connected, reactors such as interconnected loop reactors. It is also possible to introduce into the second reactor fresh olefin monomer as well as the product of the first reactor.

Because the second polyolefin is produced in the presence of the first polyolefin a multimodal or at least bimodal molecular weight distribution is obtained.

In one embodiment of the invention, the first co-reactant in the first reactor is hydrogen, to produce the first polyethylene fraction and the second co-reactant in the second reactor is the comonomer to produce the second polyethylene fraction.

In an alternative embodiment, the first co-reactant in the first reactor is the comonomer. Homopolymerization then takes place in the second reactor with little or no interference from the comonomer. Preferably, unreacted comonomer is removed before the polyethylene fraction from the first polymerization reactor is transferred to the second polymerization reactor.

The temperature in each polymerization reactor may be in the range of from 20° C. to 120° C., preferably from 60° C. to 110° C., and most preferably from 78° C. to 98° C.

The polyethylene composition disclosed herein may further comprise one or more thermoplastic polymers different from above first and second polyethylene fraction. Preferred suitable thermoplastic polymers are for example propylene homopolymers, copolymers of propylene and at least one comonomer, ethylene homopolymers, copolymers of ethylene and at least one comonomer, wherein said at least one comonomer is defined as stated above.

Caps and closures may be produced by injection molding or by compression molding, of which Injection molding is preferred. In a general form injection molding comprises the steps of
(i) melting the polyethylene composition to obtain a molten polyethylene composition;
(ii) injecting the molten polyethylene composition of step (i) into a mold, with said mold being an injection mold or a compression mold,
(iii) cooling the mold to solidify the polyethylene composition; and
(iv) recovering the injection-molded or compression-molded cap or closure.

Injection-molding as used herein is performed using methods and equipment well known to the person skilled in the art. The present polyethylene composition is injected into the mold at a melt temperature in the range from 160° C. to 280° C., preferably in the range from 180° C. to 260° C. An overview of injection molding and compression molding is for example given in Injection Molding Handbook, D. V. Rosato et al., $3^{rd}$ edition, 2000, Kluwer Academic Publishers.

The molds used in the production of the present caps and closures may be any mold usually used in the production of caps and closures, such as for example multi-cavity molds wherein a number of caps and closures is produced simultaneously.

The caps and closures of the present application are not especially limited. They may include screw-caps, caps and closures with a living hinge, glossy caps and closures, transparent caps and closures.

The caps and closures of the present application may be used in various packaging applications, such as for example food packaging, detergent packaging, cosmetic packaging, paint packaging or medical packaging. Examples in food packaging are caps and closures on tubes, bottles, such as for juices, water or milk products. Examples in detergent packaging are caps and closures for washing powders, dish soap, household cleaners. Examples in cosmetic packaging are shower gels, shampoos, oils, cremes, liquid soaps. Examples in medical packaging are packaging for pills, solutions, disinfectants.

Hence, the present application also provides for a packaging comprising the above defined caps and closures.

Test Methods

Melt index MI2 is determined according to ISO 1133, condition D, at 190° C. and 2.16 kg.

Melt index HLMI ("High load melt index") is determined according to ISO 1133, condition G, at 190° C. and 21.6 kg.

Melt index HL275 is determined in the same way as the HLMI, except that the die opening has a diameter 2.75 mm, thus allowing increased accuracy for highly viscous polyethylene compositions. HL275 can be converted to HLMI using the following equation

HLMI=HL275/3.2

Density is determined according to ISO 1183 at 23° C.

Tensile modulus was determined at 23° C. in accordance with ISO 527 using specimen 1B.

Environmental stress crack resistance (ESCR) is determined by means of a full notch creep test (FNCT) in accordance with ISO 16770 using specimen C, at a temperature of 50° C. with a strain of 6 MPa using 2% sodium dodecylbenzenesulfonate, available for example as Maranil A55 (CAS nr. 68411-30-3).

Taste was analyzed on pellets of the polyethylene composition based on the comparison of a sample and a reference. For the sample 25 g of pellets were put into 1 l of Evian water (in glass bottle). 1 l of Evian water (in glass bottle) served as the reference. Both, sample and reference, were stored in glass containers with a glass closure at 60° C. for 48 h and then at 20° C. for 48 h. Subsequently they were diluted with Evian water (in glass bottle) as shown in Table 1.

TABLE 1

| Dilution | Evain water [volume part] | Sample resp. Reference [volume part] |
|---|---|---|
| A2 | 1 | 1 |
| A3 | 2 | 1 |
| A5 | 4 | 1 |
| A7 | 6 | 1 |

These dilutions were then tested according to NF V 09-013 (based on ISO 4120:2004) by 10 qualified and specialized testers in a testing laboratory complying with NF V 09-105 (based on ISO 8589:2007). A sample is considered as having failed if there is a significant difference between reference dilution and sample dilution at level A5 or A7.

EXAMPLES

The following examples illustrate the advantages of the present invention.

PE1, a polyethylene composition in accordance with the present invention, was produced with a Ziegler-Natta polymerization catalyst in two sequentially connected slurry loop reactors. Additional polymerization conditions are indicated in Table 2. Density was calculated using equation (II) as given in the description. PE1 comprised Irganox 1010 and Irgafos 168 in a 1:2 weight ratio as well as calcium stearate in sufficient amounts.

PE2 is a commercially available polyethylene composition used for caps and closures.

PE3, a commercially available polyethylene composition used for the production of caps and closures, was produced with a metallocene catalyst in two sequentially connected slurry loop reactors.

TABLE 2

|  | Unit | PE1 |
|---|---|---|
| First polyethylene fraction (Reactor 1) |  |  |
| Density | kg/m³ | 931 |
| HL275 | dg/min | 5.5 |
| Contribution Reactor 1 | wt % | 42.5 |
| Second polyethylene fraction (Reactor 2) |  |  |
| Density (calculated) | kg/m³ | 970 |
| Contribution Reactor 2 | wt % | 57.5 |

TABLE 3

|  | Unit | PE1 | PE2 (comp.) | PE3 (comp.) |
|---|---|---|---|---|
| MI2 | dg/min | 0.87 | 0.78 | 1.8 |
| HLMI | dg/min | 62.5 | Not measured | 80 |
| Density | kg/m³ | 954.6 | 954.4 | 952.3 |
| Tensile modulus | MPa | 1070 | 1100 | 1000 |
| FNCT - F50 | h | 65 | 58 | 23.5 |
| Taste |  | Passed | Not tested | Passed |

The comparison of the properties of polyethylene composition PE1 and of comparative compositions PE2 and PE3 in Table 3 shows that the new polyethylene composition PE1 arrives at combining good stiffness, as indicated by the tensile modulus, and excellent environmental stress crack resistance, as indicated by the high value for FNCT, all the while passing the taste test according to NF V 09-013.

The invention claimed is:

1. A cap or closure comprising:
a polyethylene composition having a density of at least 940 kg/m³ and of at most 970 kg/m³ as determined according to ISO 1183 at 23° C., and a high load melt index HLMI of at least 35 dg/min and of at most 180 dg/min as determined according to ISO 1133, condition G, at 190° C. and 21.6 kg;
wherein the polyethylene composition comprises a first polyethylene fraction and a second polyethylene fraction;
wherein the first polyethylene fraction has a density of at least 920 kg/m³ and of at most 945 kg/m³ as determined according to ISO 1183 at 23° C., and a melt index HL275 of at least 3 dg/min and of at most 12 dg/min, wherein the melt index HL275 is determined in the same way as the HLMI except with a die opening having a diameter of 2.75 mm; and
wherein the second polyethylene fraction has a density of at least 960 kg/m³ and of at most 980 kg/m³ determined according to ISO 1183 at 23° C.;
with the provision that the density and the HLMI of the second polyethylene fraction are chosen such that the density and the HLMI of the polyethylene composition are as defined, wherein the density and the HLMI are calculated using the following equations (I) and (II):

$$\log(\text{HLMI}_{blend}) = w_1 \times \log(\text{HLMI}_1) + w_2 \times \log(\text{HLMI}_2) \quad (I)$$

$$d_{blend} = w_1 \times d_1 + w_2 \times d_2 \quad (II)$$

wherein $\text{HLMI}_{blend}$ is the HLMI of the polyethylene composition, $\text{HLMI}_1$ is the HLMI of the first polyethylene fraction, $\text{HLMI}_2$ is the HLMI of the second polyethylene fraction, $d_{blend}$ is the density of the polyethylene composition, $d_1$ is the density of the first polyethylene fraction, $d_2$ is the density of the second polyethylene fraction, $w_1$ is the weight percent of the first polyethylene fraction based upon a total weight of the polyethylene composition, and $w_2$ is the weight percent of the second polyethylene fraction based upon the total weight of the polyethylene composition.

2. The cap or closure according to claim 1, wherein the polyethylene composition has a density of at least 945 kg/m³ and of at most 965 kg/m³ as determined according to ISO 1183 at 23° C.

3. The cap or closure according to claim 1, wherein the polyethylene composition has a high load melt index HLMI of at least 35 dg/min and of at most 140 dg/min as determined according to ISO 1133, condition G, at 190° C. and 21.6 kg.

4. The cap or closure according to claim 1, wherein the polyethylene composition comprises at least 35 wt % and at most 55 wt % of the first polyethylene fraction, relative to a total weight of the polyethylene composition.

5. The cap or closure of claim 1, wherein the cap or closure is a cap or closure of a carbonated drink or a still drink.

6. A process for the production of a cap or closure, the process comprising:
(a) polymerizing ethylene in the presence of a Ziegler-Natta polymerization catalyst in a first polymerization reactor to produce a first polyethylene fraction having a density of at least 920 kg/m³ and of at most 945 kg/m³ as determined according to ISO 1183 at 23° C., and a melt index HL275 of at least 3 dg/min and of at most 12 dg/min;
(b) polymerizing ethylene and at least one comonomer in the presence of a Ziegler-Natta polymerization catalyst in a second polymerization reactor to produce a second polyethylene fraction having a density of at least 960 kg/m³ and of at most 980 kg/m³ as determined according to ISO 1183 at 23° C.;
(c) blending the first polyethylene fraction and the second polyethylene fraction to obtain a polyethylene composition having a density of at least 940 kg/m³ and of at most 970 kg/m³ as determined according to ISO 1183 at 23° C., and a high load melt index HLMI of at least 35 dg/min and of at most 180 dg/min as determined according to ISO 1133, condition G, at 190° C. and 21.6 kg, and wherein the melt index HL275 is determined in the same way as the HLMI except with a die opening having a diameter of 2.75 mm; and
(d) subsequently injection molding the polyethylene composition to obtain a cap or closure;
with the provision that the density and the HLMI of the second polyethylene fraction are chosen such that the density and the HLMI of the polyethylene composition are as defined, wherein the density and the HLMI are calculated using the following equations (I) and (II):

$$\log(\text{HLMI}_{blend}) = w_1 \times \log(\text{HLMI}_1) + w_2 \times \log(\text{HLMI}_2) \quad (I)$$

$$d_{blend} = w_1 \times d_1 + w_2 \times d_2 \quad (II)$$

wherein $\text{HLMI}_{blend}$ is the HLMI of the polyethylene composition, $\text{HLMI}_1$ is the HLMI of the first polyethylene fraction, $\text{HLMI}_2$ is the HLMI of the second polyethylene fraction, $d_{blend}$ is the density of the polyethylene composition, $d_1$ is the density of the first polyethylene fraction, $d_2$ is the density of the second polyethylene fraction, $w_1$ is the weight percent of the first polyethylene fraction based upon a total weight of the polyethylene composition, and $w_2$ is the weight percent of the second polyethylene fraction based upon the total weight of the polyethylene composition.

7. The process according to claim 6, wherein step (b) is conducted following step (a), and wherein the first polyethylene fraction is transferred to the second polymerization reactor and the step (b) is performed in presence of the first polyethylene fraction.

8. The process according to claim 6, wherein steps (a) and (b) are conducted in presence of the same Ziegler-Natta polymerization catalyst.

9. A cap or closure produced by the process of claim 6.

10. The cap or closure of claim 9, wherein the cap or closure is a cap or closure of a carbonated drink or a still drink.

11. The cap or closure according to claim 1, wherein the polyethylene composition has a high load melt index HLMI of at most 80 dg/min as determined according to ISO 1133, condition G, at 190° C. and 21.6 kg.

12. The cap or closure according to claim 1, wherein the polyethylene composition has a high load melt index HLMI of at most 75 dg/min as determined according to ISO 1133, condition G, at 190° C. and 21.6 kg.

13. The cap or closure according to claim 1, wherein the first polyethylene fraction has a melt index HL275 of at least 3.5 dg/min, wherein the melt index HL275 is determined in the same way as the HLMI except with a die opening having a diameter of 2.75 mm.

14. The cap or closure according to claim 1, wherein the first polyethylene fraction has a melt index HL275 of at most 11 dg/min, wherein the melt index HL275 is determined in the same way as the HLMI except with a die opening having a diameter of 2.75 mm.

15. The process according to claim 6, wherein the polyethylene composition has a high load melt index HLMI of at most 80 dg/min as determined according to ISO 1133, condition G, at 190° C. and 21.6 kg.

16. The process according to claim 6, wherein the first polyethylene fraction has a melt index HL275 of at least 3.5 dg/min, wherein the melt index HL275 is determined in the same way as the HLMI except with a die opening having a diameter of 2.75 mm.

17. The process according to claim 6, wherein the first polyethylene fraction has a melt index HL275 of at most 11 dg/min, wherein the melt index HL275 is determined in the same way as the HLMI except with a die opening having a diameter of 2.75 mm.

18. The process according to claim 6, further comprising preparing the Ziegler-Natta polymerization catalysts, wherein the Ziegler-Natta polymerization catalysts comprise a Ziegler-Natta catalyst component D and a preactivating agent, and wherein preparing the Ziegler-Natta catalysts comprises:
   generating a reaction product A by contacting a magnesium dialkoxide compound with a halogenating agent;
   contacting the reaction product A with a first halogenating/titanating agent to form a reaction product B;
   contacting the reaction product B with a second halogenating/titanating agent to form a reaction product C;
   contacting the reaction product C with a third halogenating/titanating agent to form the Ziegler-Natta catalyst component D.

19. The cap or closure according to claim 1, wherein the first polyethylene fraction and the second polyethylene fraction are both produced in the presence of a Ziegler-Natta polymerization catalyst comprising a preactivating agent and a Ziegler-Natta catalyst component D prepared by:
   generating a reaction product A by contacting a magnesium dialkoxide compound with a halogenating agent;
   contacting the reaction product A with a first halogenating/titanating agent to form a reaction product B;
   contacting the reaction product B with a second halogenating/titanating agent to form a reaction product C;
   contacting the reaction product C with a third halogenating/titanating agent to form the Ziegler-Natta catalyst component D.

* * * * *